Figure 1:
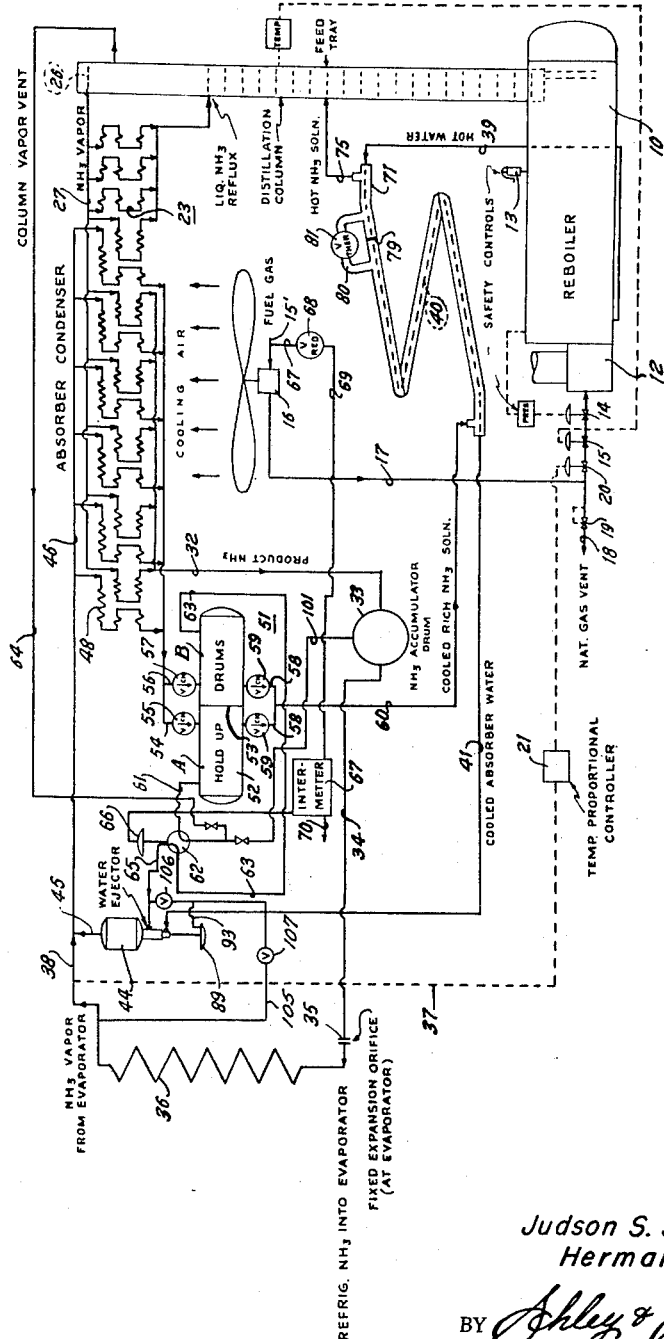

INVENTOR
Judson S. Swearingen
Herman Levin

BY Ashley & Ashley
ATTORNEY

INVENTORS
Judson S. Swearingen
Herman Levin

BY *Ashley & Ashley*

ATTORNEYS

July 3, 1962  J. S. SWEARINGEN ET AL  3,041,843
ABSORPTION TYPE REFRIGERATION SYSTEM
Filed Sept. 8, 1958  7 Sheets-Sheet 3

INVENTORS
Judson S. Swearingen
Herman Levin

BY Ashley & Ashley
ATTORNEYS

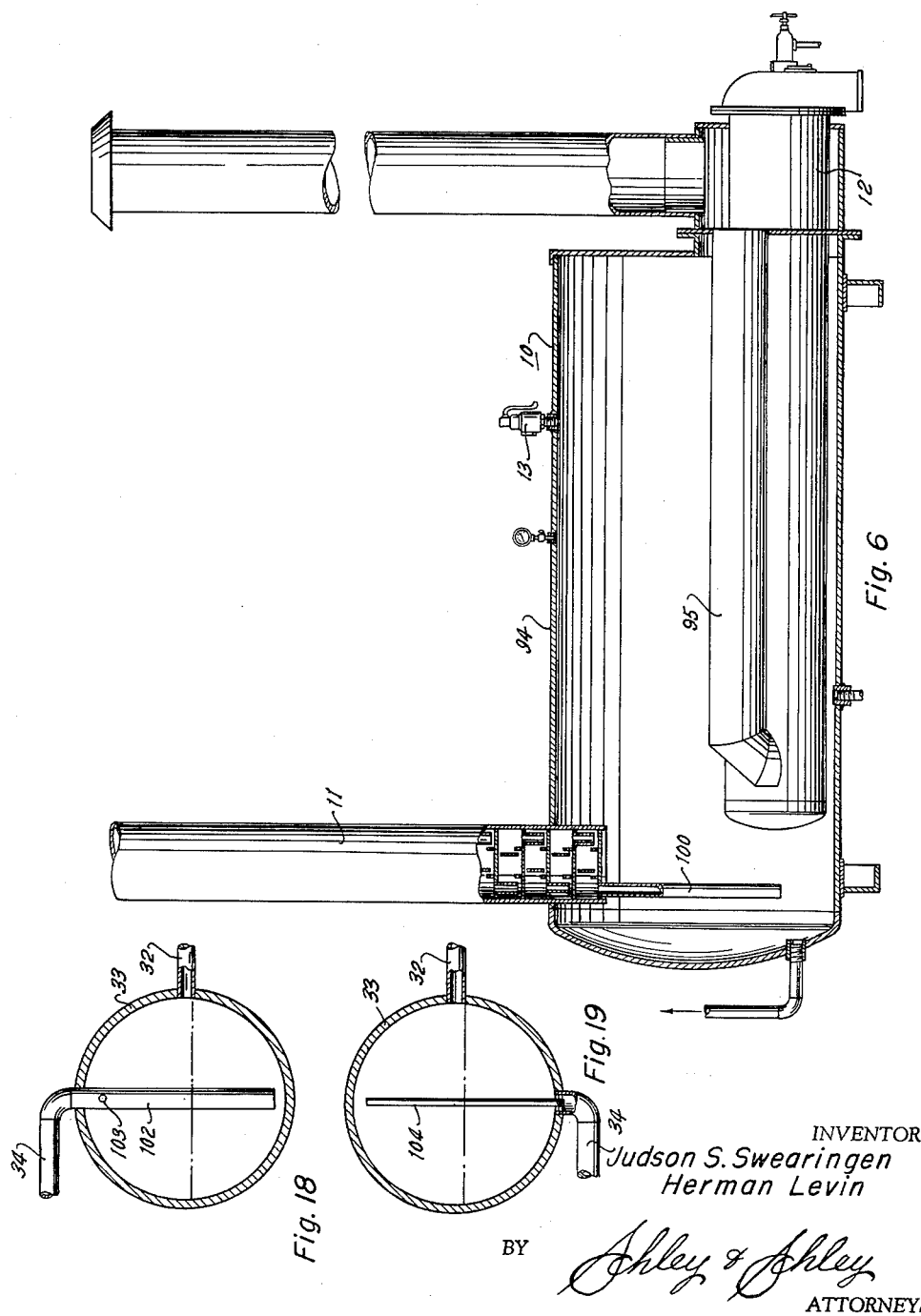

INVENTORS
Judson S. Swearingen
Herman Levin

BY *Ashley & Ashley*

ATTORNEYS

July 3, 1962    J. S. SWEARINGEN ET AL    3,041,843
ABSORPTION TYPE REFRIGERATION SYSTEM
Filed Sept. 8, 1958    7 Sheets-Sheet 6

INVENTORS
Judson S. Swearingen
Herman Levin

BY Ashley & Ashley

ATTORNEYS

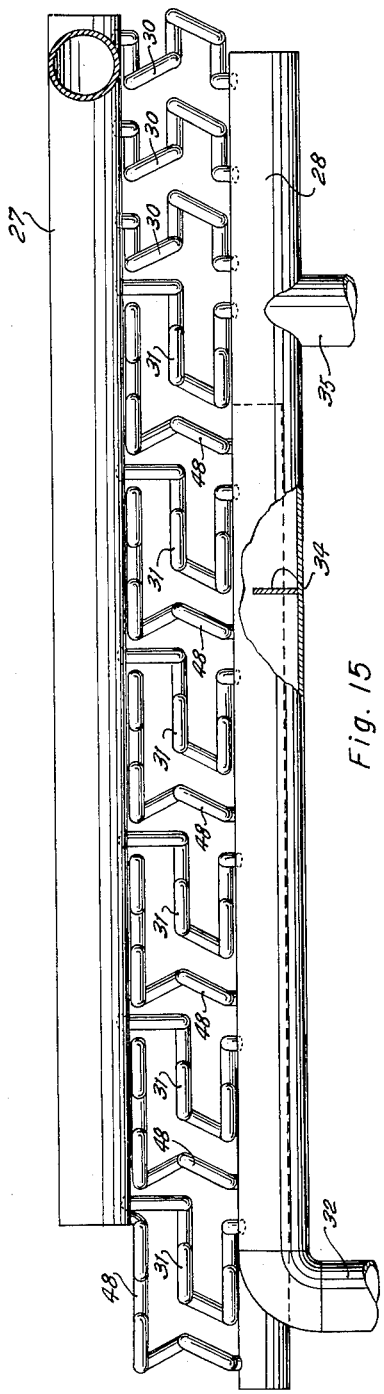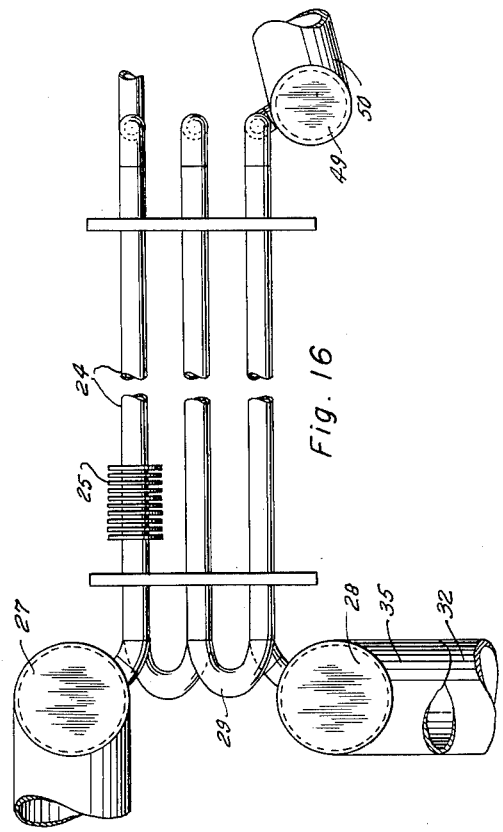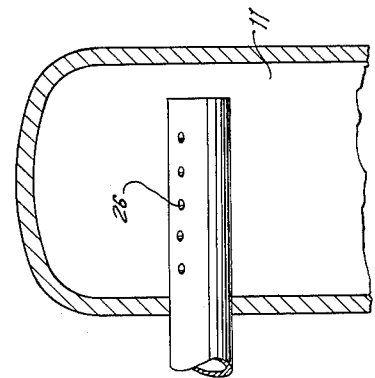

United States Patent Office
3,041,843
Patented July 3, 1962

3,041,843
ABSORPTION TYPE REFRIGERATION SYSTEM
Judson S. Swearingen and Herman Levin, San Antonio, Tex., assignors to National Tank Company, Tulsa, Okla., a corporation of Nevada
Filed Sept. 8, 1958, Ser. No. 759,821
14 Claims. (Cl. 62—105)

This invention relates to new and useful improvements in refrigeration systems.

The invention is more particularly concerned with a self-contained refrigeration system which is completely automatic in operation, is readily constructed as a unitary, compact assembly which may be shipped by motor truck under existing highway regulations without partial or complete dismantling, which is adapted to operate in remote and isolated locations where only fuel gas is available, and which is particularly adapted for the supplying of refrigeration for use in chilling the flow streams of gas or petroleum wells.

It is often possible to obtain considerably enhanced recoveries of light and valuable hydrocarbons from petroleum well streams if the temperature of the well stream can be lowered sufficiently, with or without a concurrent reduction in pressure of the well stream, to effect condensation of such light hydrocarbons, and quite often, the increased recovery of marketable products is more than sufficient to justify the installation of additional hydrocarbon recovery equipment. In many cases, it is the practice to achieve such chilling of the well stream by causing the stream to undergo a considerable pressure reduction, but because of the usual necessity of maintaining a minimum pressure on the effluent residual gas in order that the gas may be introduced into a gas transmission pipe line without recompressing, it is manifest that the degree of pressure reduction available is limited. In addition, even in those instances where the well stream is produced at a pressure sufficiently high to permit virtually any desired degree of pressure reduction, production of fluids from the petroleum reservoir ultimately results in a decrease of reservoir pressure, and a point is finally reached at which the well or wells flow at a pressure too low to permit adequate chilling of the well stream solely through pressure reduction. At this point, various expedients may be employed, one of which is the utilization of artificial refrigeration for chilling of the well stream.

It is not desirable to transmit well production over long distances under very high pressure, and therefore, it is normal to undertake the chilling of the stream, with or without pressure reduction, at a point located reasonably close to the well head, and the location of such point is, of course, dictated by the location of the well itself. Often, such locations are remote and inaccessible, and it is important that the equipment utilized be as compact as possible for transportation, that it require a minimum of assembly or connection work, that it be powered by the well products under such pressures and conditions as such products may be available, that it require a minimum of maintenance and supervision, and that it be as free as possible of mechanical motion or moving parts.

It is especially important that the unit be free of any pumps which require packing glands, and hence, it is one object of this invention to provide a self-contained, absorption type refrigeration system in which no pumps are required, and in which the high pressure refrigerant vapor is employed for the necessary transfer of liquids from one portion of the system to another.

Another object of the invention is to provide an improved absorption type refrigeration system employing a solution of a condensible vapor, such as an aqueous solution of ammonia vapor, as a refrigerant charge, and wherein high pressure ammonia vapor is employed for pressurizing the aqueous ammonia solution for recharging to the ammonia-water fractionating section of the system, the system including the improvement of incorporating a quantity of fixed gas in the ammonia system for blanketing the aqueous solution of ammonia to prevent or minimize the additional solution of the high pressure ammonia vapor therein.

Yet another object is to provide an improved refrigeration system of the character described in which provision is made for concentration of the inert or fixed gas in the vessels in which the aqueous ammonia solution is accumulated, rather than in the liquid ammonia accumulation drum, whereby the constant provision of an adequate blanket of inert gas over the aqueous ammonia solution is insured.

A still further object of the invention is to provide an improved absorption type refrigeration system in which the fractionated solvent, such as water, is flowed in a commingled stream with the refrigerant vapor from the evaporator for re-solution of the refrigerant in the solvent, and in which the rate of flow of the solvent is regulated in accordance with the back pressure on the evaporator in order to maintain said back pressure at the desired low level.

An additional object of the invention is to provide an improved refrigeration system of the ammonia water absorption type in which all of the water fractionated from the ammonia solution is commingled with and flowed with all of the ammonia vapor from the evaporator into an atmospheric absorber-condenser whereby a relatively high initial temperature is achieved during the absorption step, and efficient and effective use of atmospheric cooling may be obtained, and further, whereby, a multiple bank atmospheric cooler and absorption coil may be employed, with final cooling of the ammonia-water solution in the initial or coolest sections thereof.

A still further object of the invention is to provide an improved refrigeration system of the character described in which the hot fractionated water from the distillation unit is passed in heat exchange with the cool aqueous ammonia solution feed to the distillation unit, with temperature responsive means for regulating the flow of available ammonia solution to the distillation unit to prevent insufficient heating of the feed stream and insufficient cooling of the stream of withdrawn water, the valve throttling the flow of the feed solution and insuring its arrival in the distillation zone in properly preheated condition.

A further object of the invention is to provide an improved refrigeration system of the character described in which a unitary, multiple-bank assembly of cooling coils is adapted to be cooled by a single gas-driven fan, in which certain sections of the coils are employed for condensation of ammonia vapor, certain additional of the cooler sections of the coils are also employed for condensation of ammonia vapor, and in which warmer sections of the coils are employed for initial cooling of the hotter combined stream of ammonia exhausted from the evaporator and fractionated water, followed by final cooling of the absorption stream in cooler sections of the coils; and further, wherein the condensed ammonia is collected in a partially partitioned drum or manifold for proportional division of the flow of liquid ammonia to the distillation column as reflux, and to the evaporator as refrigerant.

A still further object of the invention is to provide an improved refrigeration system of the water ammonia absorption type operated by an automatic cycle controller in which a pair of accumulation drums are alternately filled with rich ammonia solution under low pressure and pressurized by high pressure ammonia vapor to permit the rich ammonia solution to flow by gravity into a distillation column, and in which, cooled fractionated water is flowed from the distillation section through a water ejector into a commingled flow stream with ammonia vapor effluent from the evaporator, the water ejector aspirating ammonia vapor from that accumulation drum which is currently being filled with rich ammonia solution while the other drum is being pressurized from the distillation zone with ammonia vapor for gravity flow of its rich ammonia solution into the distillation column, and further, in which the flow of water through the water ejector is regulated by the back pressure existent within the drum being filled with rich ammonia solution.

A construction designed to carry out the invention will be hereinafter described, together with other features of the invention.

Figure 3:
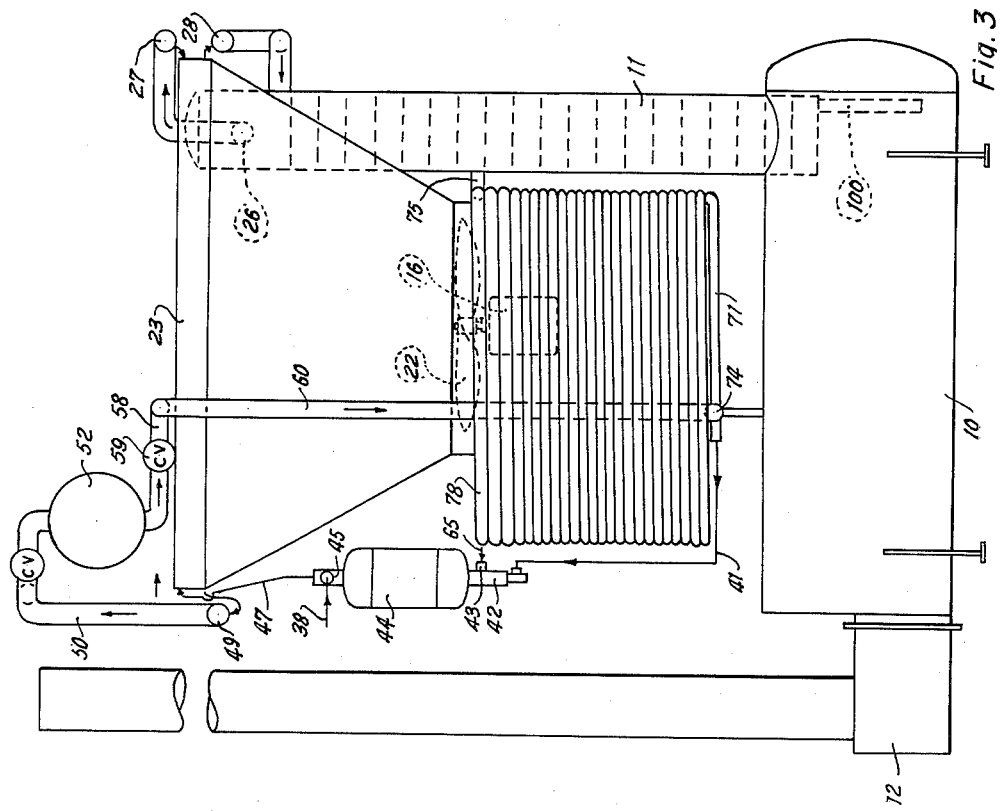
Figure 2:
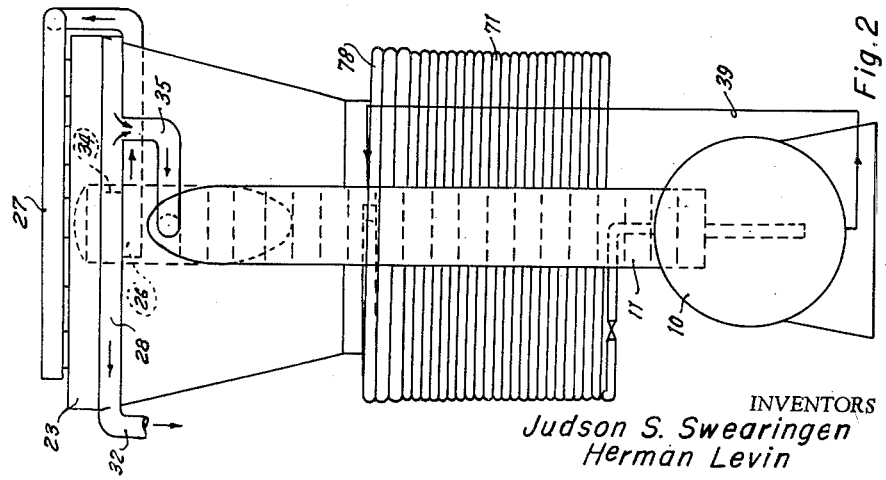
Figure 4:
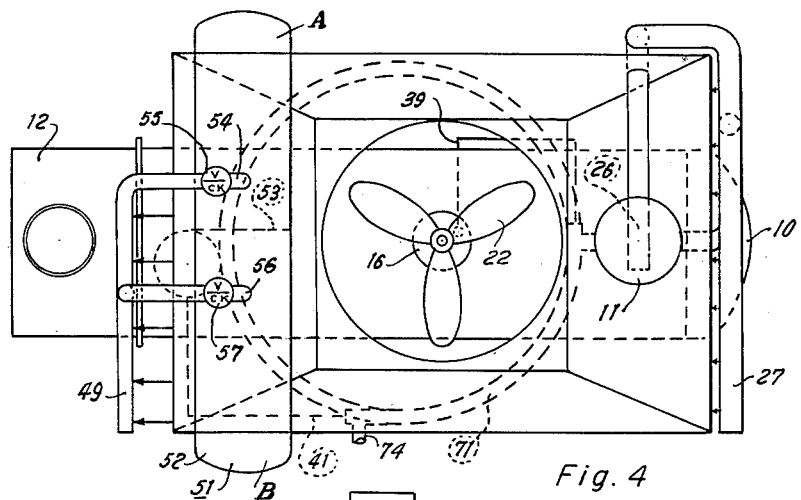
Figure 5:
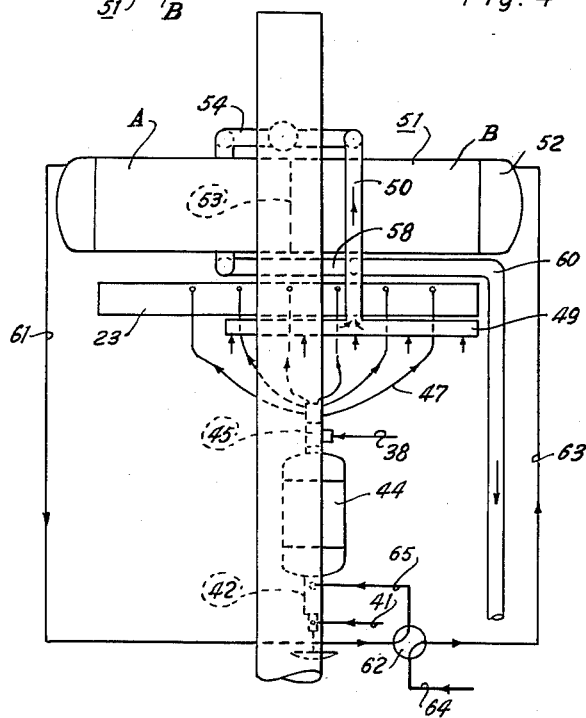
Figure 8:
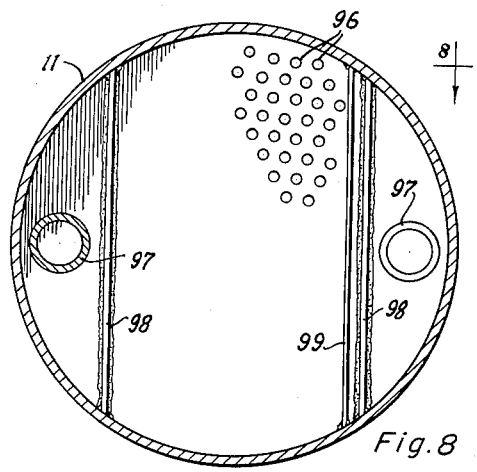
Figure 7:
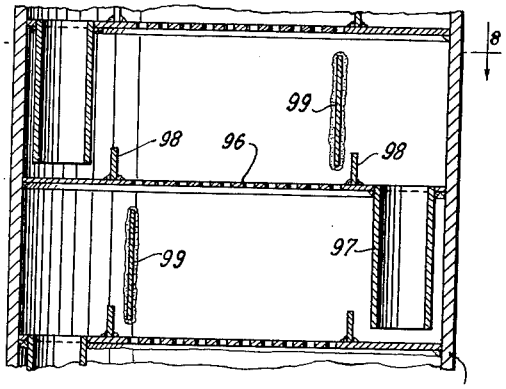
Figure 10:
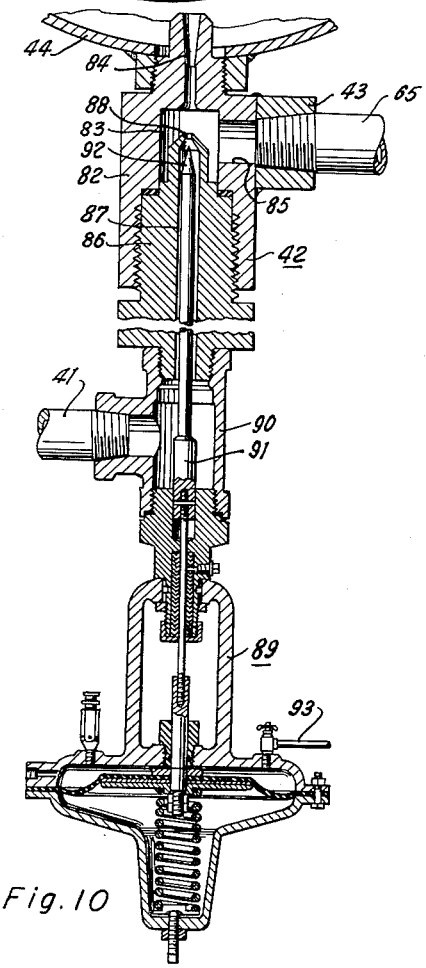
Figure 9:
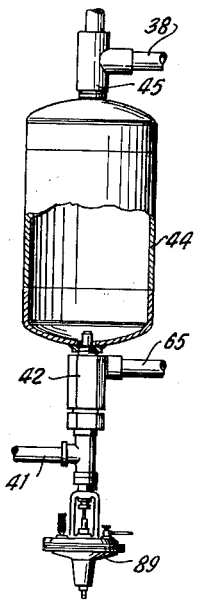
Figure 11:
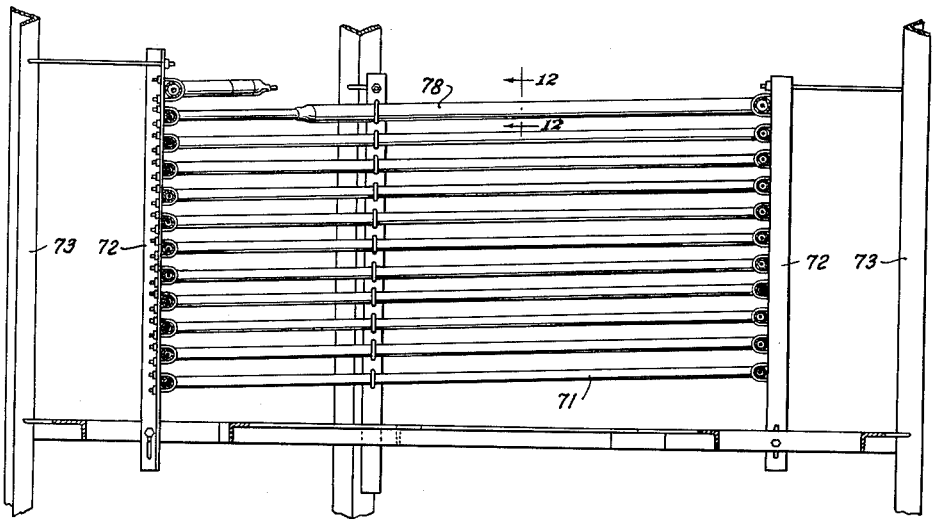
Figure 13:
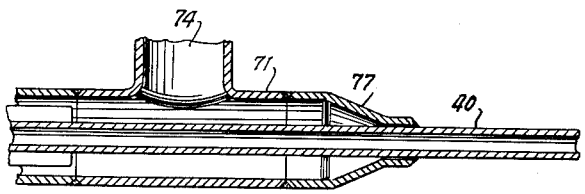
Figure 12:
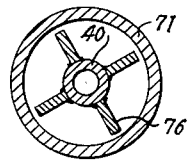
Figure 14:
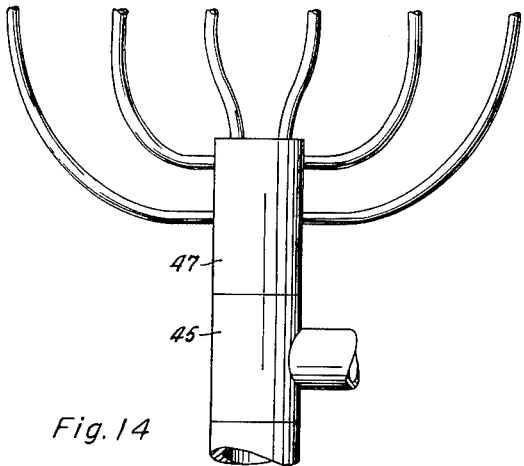

The invention will be more readily understood from a reading of the following specification and by reference to the accompanying drawings, wherein examples of the invention are shown and wherein:

FIG. 1 is a schematic view illustrating a refrigeration system constructed in accordance with this invention, FIG. 2 is a diagrammatic end elevation of the refrigeration system, the view being taken from the column end of the distillation unit, FIG. 3 is a diagrammatic side elevation of the refrigeration unit, FIG. 4 is a diagrammatic plan view of the unit, details of the tube bank being omitted, FIG. 5 is a diagrammatic view of the upper portion of the unit, the view being taken from the heater end of the distillation unit and showing the flow splitter for the absorption water, FIG. 6 is a longitudinal, vertical, sectional view of the reboiler portion of the distillation unit, FIG. 7 is an enlarged, fragmentary, vertical, sectional view of the distillation column, FIG. 8 is a horizontal, cross-sectional view taken upon the line 8—8 of FIG. 7, FIG. 9 is an enlarged view, partly in elevation and partly in section, of the water ejector unit and drum, FIG. 10 is an enlarged, vertical, sectional view of the water ejector and flow regulator portion of the water ejector assembly, FIG. 11 is a vertical, transverse, sectional view of the heat exchanger coil, FIG. 12 is an enlarged, cross-sectional view taken upon the line 12—12 of FIG. 11, FIG. 13 is an enlarged, sectional view of the terminal portion of the heat exchange coil, FIG. 14 is a fragmentary view of the absorption water flow splitter, FIG. 15 is an end elevational view of the condensing and absorption coil banks taken from the distillation column end of the bank, FIG. 16 is a view of the coil banks taken at right angles to FIG. 15 and showing the various manifolds or headers, FIG. 17 is a vertical, sectional view of the upper end of the distillation column, FIG. 18 is a vertical sectional view of the liquid ammonia accumulation drum, showing one structure for withdrawing gas therefrom, and FIG. 19 is a view similar to FIG. 18 and showing an alternate structure for gas withdrawal.

This application is a continuation-in-part of our co-pending application Serial No. 517,424, filed June 23, 1955, and now abandoned.

The refrigeration system forming the subject matter of this invention includes essentially a distillation column having a reboiler at its lower end, a multiple-bank multiple-pass assembly of air cooled condensation and absorption coils, a blower for the coils, a heat exchanger, a pair of hold-up or accumulation drums, a water ejector, and a conventional evaporator coil. Ammonia vapor is withdrawn from the upper end of the distillation column, condensed in certain of the air-cooled coils, and the liquid product split into a reflux which is returned to the distillation column, and a refrigeration product of predominantly-liquid ammonia which is fed to the evaporator through an expansion orifice. The reboiler is fired by natural gas, preferably the gas separated from the well stream to which the refrigeration is being applied, and the blower or fan for the cooling coils is also driven by this natural gas under pressure. Desirably, the exhaust gas from the gas motor driving the fan is employed as fuel gas in the reboiler.

Hot fractionated water, containing very little ammonia, is withdrawn from reboiler and passed in heat exchange with the rich aqueous ammonia solution being fed to the distillation column, and then flowed through the water ejector into the effluent ammonia vapor conductor leading from the evaporator. The commingled ammonia and water is conducted to certain of the cooling coils for absorption of the ammonia in the water, and this rich cool ammonia solution then passes into one of the accumulation drums. At the same time, the vapor space of this drum is evacuated by connection through a four-way valve with the water ejector.

At the same time, the second accumulation or hold-up drum, which has previously been filled with cool rich ammonia solution has its vapor space exposed through the second passage of the four-way valve to the high pressure ammonia vapor in the upper portion of the distillation column. The pressures between this second drum and the column are thus equalized, and the cool rich ammonia solution may flow from the second hold-up drum through heat exchange with the hot fractionated water and into the distillation column. At predetermined intervals, an automatic cycling or switching mechanism operates the four-way valve to shut off flow of rich ammonia solution to the first drum and cause such flow to enter into the second drum which now has been substantially emptied into the distillation column. The second drum is evacuated by the water ejector as it fills with rich ammonia solution, and the high pressure ammonia vapor is automatically switched through the four-way valve into the first drum for pressure equalization and gravity flow of the accumulated rich ammonia solution into the distillation column.

In this manner, a substantially continuous feed of rich ammonia solution to the distillation column is maintained, and this feed is properly preheated by heat exchange with the withdrawn hot water. At the same time, fractionated hot water is continuously withdrawn from the reboiler, cooled by heat exchange with the rich ammonia solution feed, employed to energize the water ejector and flowed into contact with the low pressure ammonia vapor for absorption thereof. A proper liquid ammonia reflux to the distillation column is maintained and a sufficient flow of liquid ammonia product for refrigeration purposes. Suitable controls are provided for regulation of the firing unit of the reboiler, as well as for regulation of the flow of absorption water into the low pressure ammonia vapor line.

The flow diagram of the refrigeration system is shown in FIG. 1 of the drawings wherein the numeral 10 designates a reboiler connected to the lower end of a distillation column 11. The reboiler is provided with a gas-fired heating unit 12 and the usual safety controls, including a pressure relief valve 13 and fuel control valves 14 and 15 responsive respectively to excessive pressure and excessive temperature in the distillation column. Fuel gas under pressure, and desirably preheated as by passage through a coil (not shown) in the lower portion of the reboiler, flows under pressure from a suitable source through a conductor 15' to a gas or fluid motor 16, and is exhausted from the motor through a conductor 17 leading through the valves 14 and 15 to the burner unit 12. A gas vent conductor 18, provided with an excess pressure relief valve 19, is connected into the line 17 for drawing off excessive quantities of gas not required by the burner unit. The valves 14 and 15 are normally fully open, and the flow of fuel gas to the burner unit is normally regulated by a diaphragm actuated valve 20 operated by a temperature proportional controller 21 to be described hereinafter.

The fluid motor 16 drives a blower or air fan 22 which supplies cooling air to a multiple-bank, multiple-pass assembly 23 of condensing and absorbing coils. Desirably, the coils are horizontally disposed and the fan 22 is positioned therebelow.

The absorber-condenser cooling coil assembly 23 may be arranged in any suitable or desirable fashion, but preferably is formed of relatively large diameter tubing 24 for minimum pressure loss due to the flow of fluid therethrough, and is provided with closely spaced, transverse, external flanges 25 for optimum heat exchange. In order to provide a compact refrigeration unit readily shipped by motor truck without disassembly, it is preferable that the coils be arranged in a number of superposed banks, as shown in FIGS. 1, 15, and 16, and that the tubes be transversely staggered between adjacent banks to afford maximum air flow thereover. It is also preferable that the various materials be fed into and removed from the cooling coils through relatively large manifolds or headers, and that the coil assembly be divided into a plurality of sections to provide separate fluid flow paths extending through a portion of the tubes of each bank of the coils, or at lease, through a portion of the tubes of more than one of the coil banks.

As a specific example, the saturated ammonia vapor fractionated from the rich ammonia solution in the distillation column 11 may be drawn off from the upper end of the distillation column through the perforated pipe 26 (FIG. 17) and into the ammonia vapor header 27 shown in FIGS. 15 and 16, and indicated schematically in FIG. 1. The header 27 is positioned at one end of the cooling coils and on the upper side thereof, and a condensed ammonia manifold 28 is correspondingly provided at the same end of the cooling coils and therebelow. The cooling coil assembly may be made up of a plurality of the elongate condenser tubes 24, divided into a number of flow paths or sections, and suitably joined at their ends by return bends 29. One suitable flow pattern for the condensing of the ammonia vapor is obtained through the provision of several relatively narrow cooling coil sections 30, extending, as shown in FIG. 15, between the header 27 and the manifold 28, and including certain of the condenser tubes 24 of each of the three banks of such tubes which have been illustrated. Obviously, since the cooling air is flowing upwardly through the banks of coils, the lowermost coils will be at the lowest temperature, and countercurrent flow is thus obtained between the ammonia vapor and the cooling air. Further, additional condensation flow paths may be provided between the header 27 and the manifold 28 by a plurality of relatively narrow cooling coil sections 31 which include certain of the condenser tubes of the lower two banks only of the condensing coils. As will appear more fully hereinafter, the combined flow of absorption water and low pressure ammonia vapor may enter the cooling coils at a relatively high temperature and may receive a considerable portion of the necessary cooling by heat exchange with fairly warm air. Hence, the passage of this combined flow of ammonia vapor and water may be concentrated to an appreciable extent in the uppermost and warmest bank of coils, and the lower banks of coils reserved primarily for the more difficult task of condensing the ammonia vapor withdrawn from the distillation column. Accordingly, the condensing coil sections 30 may include ones of the condenser tubes 24 in all three condenser banks, while the sections 31 include only tubes in the lower banks.

The liquefied, high pressure, refrigerant or product ammonia is received within the manifold 28 and flows therefrom through a pipe 32 to an ammonia accumulator drum 33 for subsequent passage to the evaporator of the refrigeration unit. It is important, however, for efficient rectification of the ammonia water solution in the distillation tower that a portion of the ammonia product be returned to the distillation column as a reflux. A very simple and effective provision for this is had by the inclusion in the manifold 28 of a transverse plate or baffle 34 (FIG. 15) positioned toward the opposite end of the manifold from the product outlet 32 and dividing the lower portion of the manifold into two sections. A reflux outlet conductor 35 is provided for conducting the liquid ammonia trapped by the partition 34 into the upper portion of the distillation column, and by this means, a positive and trouble-free means of dividing the liquid ammonia proportionately between product and reflux is afforded. The baffle 34 may be fixed within the manifold 28 to divide the total liquid ammonia into the proper proportions for reflux and product in accordance with the design specifications of the particular refrigeration unit at hand, or may be made adjustable lengthwise of the manifold 28 so that the ratio of product ammonia to reflux ammonia may be regulated as desired.

The utilization of this structure results in a relatively constant ratio of reflux to product independent of the rate of ammonia distillation. As the distillation rate from the column 11 increases the pressure and temperature of the vapor increases, and hence each of the coil sections 30 and 31 condense additional quantities of ammonia. The coil sections being equally affected ratewise, it follows that the ratio of reflux to product is maintained relatively constant.

It is to be noted that the baffle 34 divides only the lower portion of the manifold, whereby a common vapor space is provided through the length of the manifold and any fixed gases or vapors may flow from any part of the manifold through the outlet pipe 32 as will be described more fully hereinafter.

The liquid ammonia, under pressure and with or without small quantities of ammonia vapor and a fixed gas or gases, is conducted from the accumulator drum 33 through a pipe 34 to an expansion device 35 at the entrance end of the evaporator or refrigeration coil 36. Desirably, the expansion device is a fixed expansion orifice, slightly oversized to insure passage of any ammonia vapor or fixed gas or gases which may be present in the liquid ammonia stream. While the utilization of a fixed orifice reduces to some extent the flexibility and sensibility of the system, it eliminates the need for a complex and expensive expansion control unit. Instead, for purposes of control, the temperature sensing leg 37 of the temperature proportional controller 21 is connected into or exposed to the ammonia vapor flowing from the evaporator 36 in the return pipe 38. As pointed out hereinbefore, the controller 21 regulates the supply of fuel gas to the reboiler, and hence, regulates the rate of production of ammonia vapor which is subsequently condensed to a liquid ammonia refrigerant.

For absorbing the low pressure ammonia vapor entering the pipe 38 from the evaporator 36, fractionated water is withdrawn from the reboiler through the conductor 39 and passed through a conductor 40 in heat exchange with the cool rich ammonia solution feed to the distillation column. The cooled absorber water leaves the heat exchanger through the pipe 41 which is connected to the pressure fluid inlet of a water ejector 42 having a suction inlet 43 and exhausting into the lower end of a small volume drum or vessel 44. The upper end of the vessel 44 is connected to a T 45 along with the pipe 38, at which point the absorber water enters into commingled flow with the low pressure ammonia vapor.

It is to be noted that all of the fractionated water is conducted into the T 45 along with all of the ammonia vapor, whereby a considerable quantity of heat of absorption of the ammonia in the water is evolved. Hence, the commingled flow of the water, the ammonia vapor, and the partially absorbed ammonia vapor in the water, attains a relatively high temperature, possibly in the neighborhood of 200 degrees F., and this hot commingled flow stream is therefore capable of dissipating heat or losing heat to relatively warm air. The commingled flow is carried into a flow splitter, shown schematically in FIG. 1 as an elongate continuation 46 of the pipe 38, but preferably comprising the branched pipe type flow splitter 47 shown in FIGS. 5 and 14, and into which the commingled flow is conducted from the T 45. By this structure, the commingled ammonia and water is conducted in a plurality of divided streams into an equal number of relatively narrow sections 48 of the absorber-condenser assembly 23. As shown in FIG. 15, and as indicated in FIG. 1, these cooling and absorption sections 48 of the assembly 23 may consist predominantly of ones of the tubes 24 in the uppermost and warmest bank of such tubes, and may include only a few or single ones of the tubes in the lower and cooler banks. Such division of the sections 48 is made posible by the relatively high temperature at which the ammonia-water stream enters the sections, under which conditions adequate cooling or heat transfer may be achieved in the warmer portions of the absorber-condenser tube assembly, and final cooling of the combined ammonia-water stream, with final absorption of substantially all of the ammonia in the water, may be completed by relatively few passes through the lower portions of the tube assembly.

The absorption water, because of its passage through the water ejector structure 42, will undergo a pressure drop, and of course, the ammonia vapor discharged from the evaporator will likewise be at a reduced pressure. The absorption of the ammonia in the water further reduces the pressure of the commingled stream, whereby the rich cool ammonia solution will be discharged from the absorber sections 48 of the absorber-condenser assembly 23 at a pressure somewhat below that existent within the distillation column. This cooled low pressure flow stream is collected from the tube sections 48 into a discharge manifold 49, from which it is taken through a discharge pipe 50 to an accumulator drum structure 51.

As shown in FIGS. 4 and 5, and as indicated schematically in FIG. 1, the discharge drum structure desirably includes an elongate horizontal tank or vessel 52 having a medial transverse partition 53 which divides the vessel into chambers A and B. The chamber A is provided with an inlet conductor 54 having therein a check valve 55 opening into the chamber A, and the chamber B is provided with an inlet conductor 56 having therein a check valve 57 opening into the chamber B. Likewise, each of the chambers or drums A and B is provided with an ammonia solution outlet conductor 58, connected through a check valve 59 opening outwardly or away from the chambers. The two ammonia solution outlet conductors 58 are connected into a common ammonia solution flow conductor 60 downstream of the check valves 59. The cooled rich ammonia solution conductor 50 is connected into the inlet conductors 54 and 56 upstream of the check valves 55 and 57.

For pressure adjustment or vapor flow, each of the drums or chambers A and B is provided with a vapor flow line extending from its upper portion, the chamber A having a vapor flow line 61 leading therefrom to one port of a four-way valve 62, and the chamber B having a vapor flow line 63 leading to another port of the valve 62. In addition, a third port of the valve 62 is connected through a pipe 64 with the high pressure vapor space in the upper end of the distillation column 11, while the fourth port of the four-way valve 62 is connected through a pipe 65 with the suction inlet 43 of the water ejector 42. As will be described more fully hereinafter, the valve 62 is actuated at predetermined intervals, and hence, functions to expose each of the chambers A and B alternately to the suction inlet of the water ejector while the opposite chamber is exposed to the high pressure ammonia from the upper end of the distillation column. In the position shown in FIG. 1, high pressure ammonia vapor is existent within the chamber A, and the chamber B is beng partially evacuated through the action of the water ejector 42.

The cool rich ammonia solution flowing from the absorber sections 48 of the assembly 23 passes through the pipe 50 into both of the inlet pipes 54 and 56 to chambers A and B. Because of the high presure ammonia vapor present in chamber A in the cycle shown in FIG. 1, the check valve 55 remains closed, while the check valve 57 opens to admit the flow of the ammonia solution into the chamber B and the accumulation of such solution therein. Any undissolved ammonia vapor is evacuated from the drum or chamber B through the pipe 63 and is conveyed into the water ejector for commingling with the water flow passing through the latter. Any fixed gas or gases present in the chamber B are also evacuated in a similar manner, but promptly returned to the chamber because of the return flow of the ammonia and water from the water ejector through the coil sections 48 and into the drum B. Hence, when the drum B is filled, or nearly so, a quantity of any fixed gases present in the system will remain in drum B.

Drum A, having been filled with cool rich ammonia solution during the preceding cycle, and having therein a layer of any fixed gas present in the system, will receive high pressure ammonia vapor through the vapor flow pipe 61 at the same time that drum B is being filled with ammonia solution. Thus, pressure will be equalized between the distillation column and chamber A, the check valve 59 of chamber A may open, but the check valve 59 of chamber B will remain closed. Thus, cool rich ammonia solution may flow by gravity from the drum or chamber A into the outlet pipe 60 for passage in heat exchange with the hot fractionated water in the conductor 40, and discharge at the proper elevation into the distillation column 11.

Upon the end of the timed cycle and the actuation of the four-way valve 62, the operations of the chambers A and B will be switched. Thus, the chamber A will be evacuated through the water ejector 42, and will begin to fill with cool, low pressure, ammonia solution. The substantially filled chamber B will be pressurized from the distillation column, and will begin to drain its cool rich ammonia solution into the column as feed therefor.

The four-way valve 62 may be of any suitable or desirable structure, such valve being readily available commercially, or even may be constituted by a pair of three-way valves (not shown) interconnected in a conventional manner. Desirably, the valve 62 is operated by a diaphragm 66, alternately pressurized and depressurized through a timing intermitter 67, as commonly used in the petroleum art. Such intermitters may be set for any desired timing intervals, and function to alternately apply and exclude the pressure of a pilot gas supply to and from the valve operating diaphragm. As an example, a supply of pilot gas may be drawn off from the fuel gas inlet conductor 15' through the branch conductor 67' and a pressure reducing valve 68, and conveyed to the intermitter through a pilot gas supply conductor 69. Normally, such intermitters are provided with an exhaust gas outlet 70 through which pilot gas is discharged from the area of the diaphragm 66 during that time interval in which the diaphragm is not pressurized. Such structures are well known and conventional in this art.

The length of the timed intervals is subject to much variation, and is dependent upon the volumetric capacity of the accumulation chambers A and B, the capacity of the various portions of the refrigeration unit, and the particular refrigeration problem at hand. For a ten to fifty is introduced into the drum, and the solution of additional quantities of ammonia in the ammonia solution may well occur. This would result in the heating of the solution due to the positive heat of adsorption of ammonia in water, and also would result in the supplying of a feed solution to the distillation column of too high an ammonia content as well as the wastage of considerable quantities of ammonia vapor from the upper portion of the distillation column. For this reason, a small quantity of a fixed gas or gases, such as air, is introduced into the system, and as will appear, this air tends to concentrate in the hold-up drums to function as a protective blanket between the ammonia solution and the ammonia vapor. Solution of the vapor in the ammonia solution to a harmful extent is thus avoided very effectively.

Any of the fixed gas, which will be referred to as air for purposes of convenience, which enters the distillation column will promptly be removed either through the outlet conductor 27, or the pressure equalizing conductor 64. Any air leaving the column through the outlet conductor 27 will pass downwardly into the liquid ammonia outlet manifold 28 and will preferentially leave the latter through the outlet pipe 32 because there will always be some liquid ammonia overlying or standing in the conductor 35, and the air is thus prevented from returning to the distillation column through the liquid ammonia reflux conductor. Hence, the air will be forced to flow to the ammonia accumulator drum 33. Of course, any air leaving through the equalizing pipe 64 is conducted directly to one of the hold-up drums or chambers.

As previously pointed out, the expansion orifice 35 is adequate to pass out only liquid ammonia, but also some quantities of ammonia vapor and a fixed gas, and the preferential withdrawal of vapor and gas from the accumulator drum 33 will cause the fixed gas or air to pass on through the evaporator coil 36 and into the ammonia vapor outlet line 38. Of course, this air is conducted through the coils 48 and into one of the hold-up drums. Any air aspirated from one of the drums by the water ejector 42 is also returned through the coils 48 into one of the hold-up drums, and in this manner, the entire system is constantly functioning to return and concentrate the fixed gas or air in both of the hold-up drums A and B. It is desirable that the hold-up drums not be drained completely in the flowing of ammonia solution to the distillation column, or be filled completely while receiving ammonia solution from the absorber coils 48. Hence, a quantity of fixed gas tends to remain in each of the drums at all times to provide a protection blanket over the ammonia solution.

The amount of fixed gas present in the system is not especially critical, and any gas inert to ammonia and insoluble in water may be employed. For instance, air, hydrogen, nitrogen, or other gases meeting these requirements may be employed, air having been found particularly suitable for the reason that it is introduced into the system in small quantities in any event in the make-up water added to the reboiler 10. Further, the use of air eliminates the need for scrupious purging of the refrigeration system when the ammonia charge is first added thereto. The quantity of air will depend upon the size of the hold-up drums A and B, and especially, their maximum horizontal cross-sectional area. In a ten to twenty ton system, approximately one standard cubic foot of air for each hold-up drum has been found adequate. An insufficient body of air is indicated by excessive heating of that hold-up drum which is being pressurized by the ammonia vapor, and excessive quantities of air are indicated by excessive back pressures on the evaporator coil 36.

Complex and expensive refrigeration controls for the unit are avoided by the utilization of the controller 21. In essence, this controller, which is of the temperature proportional type readily available on the open market, senses the temperature in the conductor 38 and regulates or throttles the gas supply valve 20 accordingly. Of course, the valves 14, 15, and 20, as well as the valve 62, are conveniently operated by pilot gas withdrawn from the pilot gas supply line 69, although such connections have not been shown in the drawings. An increase in temperature in line 38 actuates the controller 21 to open the valve 20 an additional amount and thus increase the heating in the reboiler and the fractionation of ammonia vapor from the ammonia solution being fed to the distillation column. As the load on the evaporator coil decreases and the temperature of the effluent ammonia vapor decreases, the firing of the reboiler is accordingly adjusted by the controller 21 for reduced rectification of the ammonia solution feed into ammonia vapor and water.

In accordance with customary practice in the refrigeration art, it is desirable that the entire length of the evaporator coil 36 be employed, and that some slight amount of liquid ammonia, possibly at its boiling point, be existent near or at the outlet end of the evaporator. By this means the entire area of the evaporator coil may be brought into use, and the desired level of refrigeration temperature maintained with a refrigerant at a higher temperature than otherwise. Accordingly, the temperature sensing controller 21 may be set at only a few degrees above the desired refrigeration temperature and, by detection of an increased temperature in the discharge line 38 of the evaporator coil 36, actuate the fuel supply valve 20 to increase the ammonia flow from the distillation column 11.

Increased flow of ammonia vapor from the evaporator causes an increase in water flow from the reboiler by operation of the diaphragm-actuated metering valve 92, and by this means, the temperature controller 21 and metering valve 92 cooperate to maintain the system in stable, smooth operation. Temperature and pressure fluctuations of a harmful magnitude are avoided, as well as surging of the various fluids circulating in the system.

Any suitable or desirable type of distillation column and reboiler may be utilized, the horizontal reboiler 10 having been found very satisfactory by reasons of compactness and ease of construction. As shown in FIG. 6, the reboiler consists essentially of the elongate horizontal vessel 94 into which the lower end of the distillation column 11 extends and which contains in its lower portion the firing unit 12 having an elongate fire tube 95 extending longitudinally of the vessel. As shown in FIGS. 7 and 8, the distillation column 11 may be of the perforated tray variety and include a plurality of superposed and spaced trays 96 having downcomers 97 and upstanding, transverse weirs 98. Desirably, a transverse quieting baffle 99 extends across the column adjacent the weir 98 for each of the downcomers 97. The lowermost plate of the column carries an elongate downcomer 100 extending downwardly within the reboiler vessel 94 to a point adjacent the lower wall thereof.

Instead of withdrawing high pressure ammonia vapor from the distillation column 11 for pressurizing that one of the chambers A and B from which rich ammonia solution is being fed to the column, as is illustrated in FIG. 1 by means of the conductor 64, high-pressure ammonia vapor may be withdrawn from the accumulator drum 33 and conducted through the pipe 101 to that inlet of the four-way valve 62 to which the pipe 64 would otherwise be connected. This modification of the system has the advantage of supplying relatively cool ammonia vapor under pressure to the hold-up drum or chamber for pressure equalization between said chamber and the distillation column, and further, of returning directly to the accumulation chambers any fixed gas, such as air, which may be present in the accumulator drum 33.

In the alternative, when the pressurizing pipe 64 is employed, it is desirable to provide a means for withdrawing vapors and gas from the drum 33 along with the liquid refrigerant ammonia in order that such vapor, and especially such gas, may be conducted onward in the ton refrigeration unit wherein the refrigeration is carried out at a temperature of the magnitude of zero degrees Fahrenheit, a timed interval of approximately ten minutes has been found suitable. This means that for a ten minute period, or a portion thereof, chamber B will be filling with cool ammonia solution while chamber A is discharging ammonia solution to the distillation column. During the next ten minute interval, the functions of the chambers are reversed. Obviously, longer or shorter intervals may be employed as desired or necessary.

The heat exchanger for cooling of the fractionated water and preheating of the distillation column feed is indicated schematically in FIG. 1, and is shown in some detail in FIGS. 11 through 13. For purposes of compactness, the heat exchanger assembly includes an outer coil 71 formed into a generally helical shape and suitably supported upon upright frame members 72, carried in turn upon the main frame elements 73 of the refrigeration unit 10 and below the fan and condenser tube assembly. The coil 71 forms the shell side of the heat exchanger, and as indicated in FIG. 1, the cool rich ammonia solution is conducted from the pipe 60 into the lower end of the coil 71 through a short branch inlet fitting 74. Similarly, the hot or preheated ammonia feed solution is conducted from the upper end of the coil 71 into the distillation column through a lateral or branch conductor 75.

The heat exchanger conductor 40 through which the hot water from the reboiler is conducted from the supply pipe 39 to the pipe 41, extends concentrically within the coil 71, and desirably, is provided throughout its length with longitudinally extending heat exchange or transfer fins 76. The fins 76 space and support the pipe 40 within the coil 71, and of course, provide amplified heat exchange surface. Although any suitable manner of sealing off the ends of the coil 71 may be employed, a practical and inexpensive structure is illustrated in FIG. 13, in which a swaged collar 77 is welded between the open end of the coil 71 and the outer wall of the pipe 40. The lateral inlet 74 of the coil 71 is also shown in this figure.

By the time the ammonia feed solution reaches the terminal portion of the coil 71, the solution will be at or near its boiling point. Hence, there will be vapor evolution and an increase in volume of the fluid flowing to the distillation column 11. To avoid excessive pressure drop in this terminal portion of the coil 71 it is therefore desirable that the flow space for the ammonia feed solution be increased in this part of the coil, thus, it is advantageous to increase the diameter of the top several turns of the coil 71, as shown at 78 in FIGS. 2, 3, and 11.

Also, it is important that the ammonia solution being fed to the distillation column be at a properly elevated temperature, and that the hot water being withdrawn from the reboiler through the pipe 39 be properly cooled before entering the water ejector 42. For this reason, a thermostatic valve is included in the terminal portion of the coil 71 so as to restrict or shut off the flow of ammonia solution if the temperature of the same is not sufficiently elevated at that point. As shown in FIG. 1, the terminal portion of the coil 71 may be closed off or appreciably obstructed by a transverse element 79, and a by-pass 80 provided around such obstruction element and through a thermostatic valve 81. That hold-up drum which is draining ammonia solution into the distillation column may tend to drain too rapidly, and indeed, might drain completely during one-half or less of the predetermined time interval. This would mean that no feed would pass to the distillation column during the second portion of the timed interval, and improper operation would result. By means of the thermostatic valve 81, the rate of flow of the ammonia feed solution may be controlled since too rapid a flow results in insufficient heating of the ammonia solution and the closing or partial closing of the valve 81 to restrict such flow. Thus, proper preheating of the ammonia solution feed is insured, and an adequate cooling media for the hot water is maintained.

This thermostatic valve structure is important for stable operation of the system because of the refluxing effect of the ammonia solution feed to the column 11 as well as for the constant correlation between the feed solution flow rate and the rate of hot water withdrawal from the reboiler. Instead of an intermittent, widely-varying feed flow to the column, a continuous, smoothly-varying flow is obtained. Further, since increased hot water withdrawal from the reboiler will heat and open the thermostatic valve 81, an according increase in feed flow results.

The water ejector structure is shown in detail in FIGS. 9 and 10 and includes an elongate ejector body 82 having its upper end reduced and screw-threaded into the lower end of the vessel 44. An axial ejector chamber 83 is formed in the body 82, and a restricted, Venturi-like passage 84 extends from the chamber into the vessel 44, while a lateral or radial suction passage 85 is provided between the suction inlet fitting 43 and the chamber. A nozzle unit 86 is screw-threadedly mounted in the lower portion of the body 82 and is formed with an axial water flow passage 87 terminating at its upper end in a reduced nozzle 88 projecting into the chamber 83 and being alined axially with the outlet passage 84. In the usual manner, the flow of water in a high velocity jet from the nozzle 88 into and through the reduced passage 84 results in the aspirating or ejecting of fluid from the chamber 83 and the consequent communication of a reduced pressure through the radial inlet 85.

For regulating the rate of flow of water through the nozzle 88, a conventional, pressure-actuated diaphragm structure 89 is connected onto the lower end of the nozzle unit 88 by a T 90 into which the inlet pipe 41 is also connected. The actuating stem 91 of the diaphragm unit is elongated and extends upwardly through the axial passage 87 to terminate in a needle valve head 92 within the nozzle 88. Manifestly, as the diaphragm structure moves the needle valve head toward and away from the outlet opening of the nozzle 88, the volume of water flowing therethrough will accordingly be diminished or increased.

As shown schematically in FIG. 1, a pressure fluid conducting line 93 is provided between the pipe 65, which is connected in the inlet fitting 43 of the water ejector, and that side of the diaphragm of the diaphragm unit upon which the application of pressure tends to move the needle valve head 92 into a more open position to increase the flow of water through the nozzle 88. Thus, as pressure increases in the pipe 65 due to the increase of pressure in that one of the chambers A and B which is currently being filled with rich ammonia solution, this increased pressure is communicated through the line 93 which will cause the diaphragm unit to move its actuating shank 91 downwardly and permit increased flow of water from the pipe 42 through the nozzle 88 and into the outlet passage 84, thereby increasing the ejecting or aspirating effect of the ejector unit and consequently lowering the pressure in the pipe 65 and in the chamber to which the pipe is currently connected through the valve 62.

It is to be noted that this reduction in pressure within the chamber A or B which is being filled with rich ammonia solution, is communicated back through the absorber coil sections 48 to the ammonia vapor discharge pipe 38 leading from the evaporator 36, and hence, the back pressure upon the evaporator coil is regulated and maintained by the control of water flow through the water ejector, the back pressure on the evaporator being adequately detected by the pressure sensing connection 93 leading from the diaphragm unit to the pipe 65. Therefore, the temperature of the evaporator is regulated by the controlling of the water flow to the ejector.

In equalizing the pressure between the distillation column and that hold-up drum or chamber A or B from which cool ammonia solution is to be flowed to the distillation column, high pressure, saturated ammonia vapor system into the hold-up or accumulation drums A and B. One structure of the accumulator drum for achieving this purpose is shown in FIG. 18 of the drawings in which the refrigerant flow line 34 is connected to a dip tube 102 extending downwardly within the drum 33 to a point near the lower end thereof for withdrawal of liquid ammonia, and being provided with a small, restricted orifice 103 within and near the upper portion of the drum. Thus, as liquid ammonia is withdrawn from the dip tube and into the conductor 34, vapors and fixed gases are aspirated from the drum through the small orifice 103 and into the refrigerant line 34.

An alternate structure is shown in FIG. 19 in which the refrigerant line 34 is connected into the bottom of the accumulator drum 33, and a reduced diameter vapor conductor 104 is provided within the drum, the pipe 104 extending from the upper portion of the drum into the conductor 34. The aspirating effect of the liquid ammonia flowing through the outlet into the conductor 34, will result in withdrawal of vapor and fixed gas from the upper portion of the drum 33 through the conductor 104 and effectively provide for the flow of such vapor and gas onward through the system.

The operation of the system should be clear from the foregoing, it being noted that the refrigeration unit is subject to much variation as to the temperature level at which refrigeration is provided, the refrigerating capacity of the unit, and the sizes and capacities of the various vessels and component elements.

In a typical refrigeration system constructed in accordance with this invention and adapted to provide from three to thirteen or more tons of refrigeration at a temperature level of zero degrees Fahrenheit, an evaporator pressure of fifteen pounds per square inch gauge was employed with flow rates of refrigerant ammonia of 290 pounds per hour. The reboiler was operated at a temperature of four hundred degrees Fahrenheit and under a pressure of 260 pounds per square inch gauge, 695 pounds per hour of ammonia vapor being evolved at this pressure, and being condensed in the atmospheric condenser at a pressure of 210 pounds per square inch gauge and a temperature of 104 degrees Fahrenheit. Four hundred and five pounds per hour of the ammonia product was employed as reflux.

Eight hundred and seven pounds per hour of a two percent by weight ammonia solution was withdrawn from the reboiler at a temperature of 398 degrees Fahrenheit, cooled to a temperature of 133 degrees Fahrenheit in the heat exchanger and passed to the water ejector. Twenty-two pounds per hour of vapor and gas were withdrawn from the accumulation drums as they were filling with cool rich ammonia solution, and this water, vapor and gas flow, combined with the 290 pounds per hour of refrigerant was returned to the absorber-condenser sections of the coil assembly to provide a total flow of 1,119 pounds per hour of 29.3 percent ammonia solution flowing to the accumulation drums at a pressure of 15 pounds per square inch and a temperature in the neighborhood of 120 degrees Fahrenheit. 17.4 pounds per hour of ammonia vapor were employed for pressurizing the accumulation drums, and a total feed solution flow from the drums to the heat exchanger of 1,114 pounds per hour, at a temperature of 121 degrees and a pressure of 260 pounds per square inch gauge was observed. The feed solution entered the distillation column at a temperature of 276 degrees Fahrenheit, and 229 pounds per hour of fuel gas at a pressure of 100 pounds per square inch gauge was employed for driving the cooling fan and firing the reboiler.

The foregoing pressures, temperatures, and flow rates, are given as examples only, and again are subject to much variation in accordance with the operating characteristics and design of a particular refrigeration unit. Obviously, where it is possible to employ larger absorber and condenser coils, as well as more numerous coils, increased numbers of trays in the distillation column, and increased elevation of the accumulation drums, marked effects upon the characteristics and operation of the system will be observed. Thus, the teaching and principles of this invention may be employed in widely differing designs of refrigeration systems.

As illustrated in FIG. 1, the back pressure on the refrigerator or evaporator coil 36 may also be controlled through a pressure fluid conducting line 105 connected between the line 93 and the outlet of the evaporator coil. A valve 106 in the line 93 and a valve 107 in the line 105 permit selection as to which of the lines is to be employed for controlling the flow of water through the water ejector 42. In actual practice, it is of no import which of the lines is employed since both function to convey to the diaphragm structure 89 the pressure existent at the outlet of the evaporator coil and hence to regulate the diaphragm unit, and the flow of absorption fluid, in accordance with such outlet pressure to increase the flow of absorption fluid as the evaporator outlet pressure increases.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of refrigerating by an absorption cycle in which a refrigerant solution is resolved into a refrigerant vapor and a liquid absorbent therefor; the refrigerant vapor is condensed to a refrigerant liquid and expanded into an evaporator; the liquid absorbent is commingled with the exhaust refrigerant from the evaporator, cooled, and conveyed to an accumulation chamber from which the reconstituted refrigerant solution is returned to the fractionation step under the pressure of refrigerant vapor withdrawn from the fractionation step; the improvement including flowing the liquid absorbent from the zone of resolution of the refrigerant solution to the zone of commingling of the liquid absorbent with the exhaust refrigerant and creating a low pressure zone during such flow, exposing the accumulation chamber to the low pressure zone to flow gas from the accumulation chamber to the low pressure zone, commingling the gas with the liquid absorbent in the low pressure zone, and continuously returning the gas commingled with the liquid absorbent in the form of the reconstituted refrigerant solution to the accumulation chamber to maintain a blanket of fixed gas in the accumulation chamber over the body of refrigerant solution therein to eliminate excessive solution of refrigerant vapor in said solution.

2. In a method of absorption refrigeration, fractionating a refrigerant solution into a refrigerant vapor and a liquid absorbent therefor, condensing the refrigerant vapor into a refrigerant liquid conducting the refrigerant liquid and expanding the latter into an evaporator, exhausting refrigerant from the evaporator, flowing the liquid absorbent from the fractionation step into a commingled stream with the refrigerant exhausted from the evaporator, increasing the rate of flow of the liquid absorbent as the pressure of the refrigerant exhausted from the evaporator increases, cooling the commingled refrigerant and liquid absorbent to reconstitute the refrigerant solution, and returning the refrigerant solution to the fractionation step.

3. In a method of absorption refrigeration as set forth in claim 2, passing the liquid absorbent through an ejector unit between the fractionation step and the absorption step to create a low pressure zone, exposing the absorber to said low pressure zone, and increasing the flow of the liquid absorbent through the ejector unit as the exhaust pressure of the evaporator increases, whereby the evaporator temperature is maintained at a uniform level.

4. A refrigerating apparatus of the absorption type including, a distillation unit for separating a refrigerant solution into a refrigerant vapor and a liquid absorbent therefor, a condenser for liquefaction of the refrigerant vapor, an evaporator, means for conducting refrigerant to the evaporator, an absorber, an ejector unit, means for passing the liquid absorbent through the ejector unit so that the flow of the liquid absorbent through the ejector unit creates a zone of lowered pressure, means for conducting refrigerant from the evaporator separately of the ejector unit and liquid absorbent from the ejector unit to the absorber to reconstitute the refrigerant solution, and means separate from the last-named means for maintaining the absorber constantly in communication with said zone of lowered pressure.

5. In a refrigerating process of the type in which a refrigerant vapor is vaporized in a heating zone from a refrigerant solution, condensed, passed through an evaporator and returned into commingled flow with a liquid absorbent to reconstitute the refrigerant solution which is returned to the heating zone; the improvement including, conducting the liquid absorbent prior to the flow of the liquid absorbent to the point of commingling through an ejector unit so that the flow of the liquid absorbent through the ejector unit creates a zone of lowered pressure, and maintaining the point of commingling constantly in communication with said zone of lowered pressure through a flow path separate and apart from the path for conducting the liquid absorbent to the point of commingling.

6. In a refrigerating process of the type in which a refrigerant vapor is vaporized in a heating zone from a refrigerant solution, condensed, passed through an evaporator and returned into commingled flow with a liquid absorbent to reconstitute the refrigerant solution which is returned to the heating zone; the improvement including, conducting the liquid absorbent prior to the flow of the liquid absorbent to the point of commingling through an ejector unit so that the flow of the liquid absorbent through the ejector unit creates a zone of lowered pressure within the ejector unit, and maintaining the evaporator and the point of commingling constantly in communication with said zone of lowered pressure through a flow path separate and apart from the path for conducting the liquid absorbent to the point of commingling.

7. In a refrigerating apparatus of the type in which a refrigerant vapor is vaporized in a heating zone from a refrigerant solution, condensed, passed through an evaporator and returned into commingled flow with a liquid absorbent to reconstitute the refrigerant solution which is accumulated in an enclosure and subsequently returned to the heating zone; the improvement including, an ejector unit, means for conducting the liquid absorbent from the heating zone prior to the flow of the liquid absorbent to the point of commingling through the ejector unit so that the flow of the liquid absorbent through the ejector unit creates a zone of lowered pressure, and means separate from the last-named means for maintaining the enclosure constantly in communication with the zone of lowered pressure.

8. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator and liquid absorbent from the distillation unit to the absorber to reconstitute the refrigerant solution and to create a low pressure zone, first and second accumulation enclosures, means for conveying refrigerant solution from the absorber to the enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, a heat exchanger having a pair of flow paths in thermal juxtaposition, means for passing the liquid absorbent through one of the flow paths of the heat exchanger in the conducting of said absorbant from the distillation unit to the absorber, means for passing the refrigerant solution through the other flow path of the heat exchanger in the conveying of the refrigerant solution from the enclosures to the distillation unit, and a thermal responsive flow controlling element in the latter flow path for restricting the flow of refrigerant solution when said solution is at a temperature below a predetermined level.

9. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator and liquid absorbent from the distillation unit to the absorber to reconstitute the refrigerant solution and to create a low pressure zone, first and second accumulation enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, a heat exchanger having a pair of flow paths in thermal juxtaposition, means for passing the liquid absorbent through one of the flow paths of the heat exchanger in the conducting of said absorbent from a distillation unit to the absorber, means for passing the refrigerant solution through the other flow path of the heat exchanger in the conveying of the refrigerant solution from the enclosures to the distillation unit, and a thermal responsive flow controlling element in the latter flow path at a point near its point of entry into the distillation unit.

10. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator and liquid absorbent from the distillation unit to the absorber to reconstitute the refrigerant solution and to create a low pressure zone, first and second accumulation enclosures, means for conveying refrigerant solution from the absorber to the enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, the means for conducting liquid absorbent from the distillation unit to the absorber including means for increasing the rate of flow of the liquid absorbent as the exhaust pressure of the evaporator increases.

11. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator, means for conducting refrigerant from the evaporator and liquid absorbent from the distillation unit to the absorber to reconstitute the refrigerant solution and to create a low pressure zone, first and second accumulation enclosures, means for conveying refrigerant solution from the absorber to the enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, the condenser and the absorber including a plurality of cooling coils, a fan for passing a stream of cooling air over said coils, a gas driven motor for operating said fan, means for supplying fuel gas under pressure to said motor for powering the same, gas fired heating means for the distillation unit, and means for conducting at least a portion of the exhaust gas from the fan motor to the heating means as fuel gas therefor.

12. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator and liquid absorbent from the distillation unit to the absorber to reconstitute the refrigerant solution and to create a low pressure zone, first and second accumulation enclosures, means for conveying refrigerant solution from the absorber to the enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, the condenser including a plurality of cooling coils having separate outlets for liquefied refrigerant, a common manifold into which the separate outlets of the cooling coils are connected, and a partition dividing the lower portion of the manifold intermediate its ends into two sections having a common vapor space and isolating the refrigerant exiting from certain of the coils from refrigerant exiting from others of the coils, means for conducting refrigerant from one section of the manifold to the evaporator, and means for conducting refrigerant from the other section of the manifold to the distillation unit as a reflux.

13. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator and liquid absorbent from the distillation unit to the absorber to reconstitute the refrigerant solution and to create a low pressure zone, first and second accumulation enclosures, means for conveying refrigerant solution from the absorber to the enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, a refrigerant accumulator vessel for receiving liquefied refrigerant from the condenser and within which the high pressure zone is created, and means for withdrawing refrigerant vapor from the refrigerant accumulator vessel simultaneously with any gas present within the upper portion of the vessel and for conducting said vapor and gas to that enclosure being exposed to the high pressure zone.

14. A refrigerating apparatus of the absorption type including, a distillation unit for separating a refrigerant solution into a refrigerant vapor and a liquid absorbent therefor and creating a high pressure zone, a condenser for liquefaction of the refrigerant vapor, an evaporator, means for conducting refrigerant to the evaporator, an absorber, means for conducting refrigerant from the evaporator and liquid absorbant from the distillation unit to the absorber to reconstitute the refrigerant solution and to create a low pressure zone, first and second accumulation enclosures, means for conveying refrigerant solution from the absorber to the enclosures, means for conveying the refrigerant solution from the enclosures to the distillation unit, valve means for exposing the first enclosure to the high pressure zone and isolating the second enclosure from the high pressure zone and for simultaneously exposing the second enclosure to the low pressure zone and isolating the first enclosure from the low pressure zone, means for alternating between the enclosures exposure to and isolation from the high and low pressure zones, the means for conducting refrigerant and liquid absorbent to the absorber including an ejector for creating the low pressure zone, means for conducting the refrigerant and liquid absorbent from the ejector into a commingled stream, means for dividing the latter stream into a plurality of smaller streams, and the absorber including a plurality of cooling coil sections into each of which one of the smaller streams is conveyed.

References Cited in the file of this patent

UNITED STATES PATENTS

| | | |
|---|---|---|
| 462,551 | Hill | Nov. 3, 1891 |
| 1,134,269 | Hiester | Apr. 6, 1915 |
| 1,342,403 | Baxter | June 1, 1920 |
| 1,527,833 | Buchel | Feb. 24, 1925 |
| 1,874,654 | Taylor | Aug. 30, 1932 |
| 1,922,203 | Hedlund | Aug. 15, 1933 |
| 1,934,690 | Babcock | Nov. 14, 1933 |
| 2,207,260 | Zuenzli | July 9, 1940 |
| 2,237,622 | Hubacker | Apr. 8, 1941 |
| 2,329,192 | Flukes | Sept. 14, 1943 |
| 2,582,838 | Leonard | Jan. 15, 1952 |